July 2, 1963
J. W. KISLING III
3,095,930
FLUID SAMPLERS
Filed April 27, 1959
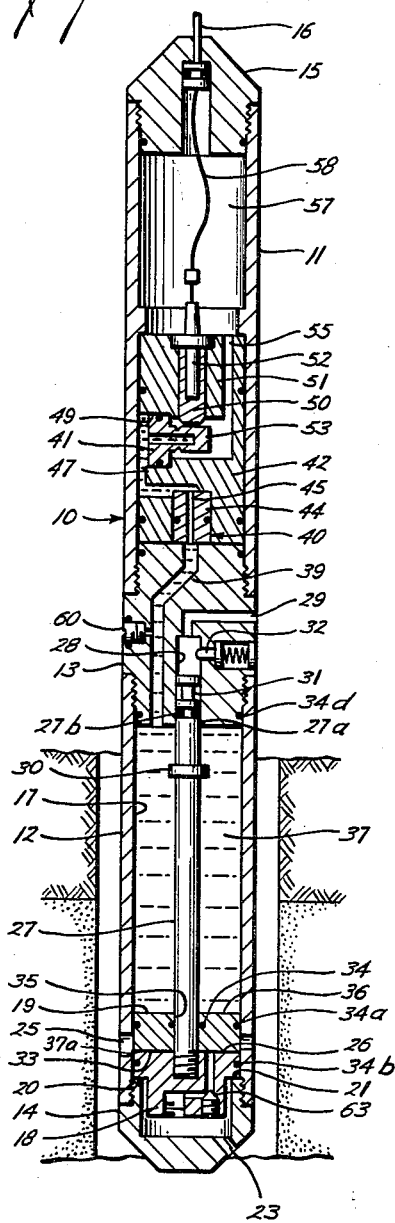
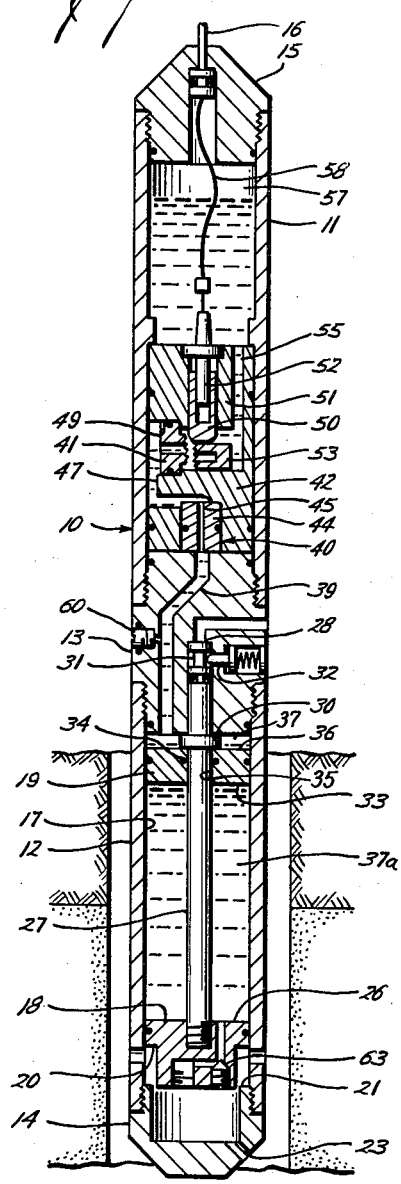
James W. Kisling, III
INVENTOR.
BY Donald H. Fidler
ATTORNEY

United States Patent Office 3,095,930
Patented July 2, 1963

3,095,930
FLUID SAMPLERS
James W. Kisling III, Houston, Tex., assignor to Schlumberger Well Surveying Corporation, Houston, Tex., a corporation of Texas
Filed Apr. 27, 1959, Ser. No. 809,102
12 Claims. (Cl. 166—163)

This invention relates to fluid sampling apparatus and, more particularly, to sampling apparatus to obtain fluid samples representative of the fluid at a given depth in a well bore.

Present fluid sampling devices now in use generally fail in some manner to provide for the collection and retention of a truly representative fluid sample from a well bore. This is particularly true when the fluid being sampled is near the two-phase equilibrium point such that a slight disturbance will cause volumetric changes in the fluid due to the conversion of liquid to gas or vice versa. The disturbance, for example, may be due to restricted or turbulent fluid flow such that an appreciable lowering of pressure occurs during the collection of fluid which results in gas separation.

Another difficulty in collecting a fluid sample is that the sample is often obtained after exposure of the sample chamber to the fluid column during the trip into the hole. This contaminates the sample with fluids from other regions than the one of primary interest. Still another difficulty is the loss of pressure or fluid from a sampler due to the inaccurate operation of valves closed by differential pressure as the tool is raised from a sampling position.

This invention overcomes the aforesaid difficulties by satisfying four basic conditions. First, the sample chamber is maintained at zero volume until the time arrives to collect the sample. Second, the sampling process does not begin until desired and can be accomplished with the tool held stationary at a given depth. Third, the speed of the sample gathering is controlled such that laminar flow exists and there is no turbulence; and fourth, at the conclusion of the sampling, the chamber is closed with no change in volume such that there is no tendency to alter the contents of the sample.

Accordingly, it is an object of the present invention to provide a new and improved apparatus for obtaining a sample of borehole fluid in which the sample will not change phase as a sample is taken.

It is another object of the present invention to provide new and improved apparatus for obtaining a borehole fluid sample in which the sample chamber is not exposed to well fluids before a sample is taken.

Still another object of the present invention is to provide new and improved borehole apparatus for obtaining a fluid sample.

Yet another object of the present invention is to provide new and improved apparatus in which all of the sample obtained by a fluid sampling apparatus may be transferred under pressure to a separate container.

These and other objects of the present invention are accomplished by apparatus provided with an expandable sample-receiving chamber which is normally maintained at zero volume until it is desired to obtain a sample. To obtain a fluid sample at the desired location, the chamber is permitted to expand at a controlled rate until a predetermined volume is contained in the chamber. Thereafter, the fluid sample is isolated from the borehole fluid. More specifically, a housing contains a pair of relatively movable pistons, the pistons being adapted to be releasably held in adjacency so that there is zero volume between them before a fluid sample is taken. When a fluid sample is desired, one of the pistons is released for movement under the influence of a fluid sample received through an opening between the pistons. The one piston moves relative to the other a predetermined distance thereby expanding the volume of the chamber to a predetermined value whereupon both pistons are movable to isolate the chamber from the sample admitting opening thus entrapping a fluid sample between the pistons.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

FIG. 1 is a view in cross section of apparatus embodying the present invention in one condition of operation.

FIG. 2 is a view in cross section of apparatus embodying the present invention in another condition of operation.

Referring now to FIG. 1, the sampling apparatus according to the present invention includes a housing 10 made up of upper and lower tubular members 11 and 12 respectively connected to an intermediate cylindrical coupling member 13, a bottom end cap 14 and an upper end cap 15. The cap 15 is coupled to an electrical cable 16 for suspension of the apparatus in a well. Well-known means (not shown) provided at the surface of the earth are employed to raise and lower the apparatus to desired levels in a borehole and the apparatus itself may be constructed small enough for passage through tubing as well as a cased or open hole.

The lower tubular member 12 forms a cylinder 17 in which a pair of pistons 18, 19 are slidably received. The piston 18, which is disposed between piston 19 and cap 14, has a downwardly facing annular shoulder 20 formed between a piston head and a portion of smaller diameter, the shoulder 20 being adapted to abut with an upwardly facing annular shoulder 21 on the bottom end cap 14. End cap 14 also has an opening 23 to permit well fluid access to the lower side of piston 18 while tubular member 12 has openings or ports 25 just above the upper side 26 of piston 18 (in its lowermost position) thereby permitting piston 18 to be pressure balanced in the described position. Projecting upwardly from the upper face of piston 18 is a smaller diametered piston rod 27 which has its upper end 27a slidably received within a bore 28 of the coupling member 13. The end 27a is provided with a sealing means 27b while the bore 28 is connected by a passageway 29 to the exterior of the coupling member for pressure balance. Intermediate the length of rod 27 is an annular projection 30 which forms an upper shoulder adapted to abut coupling member 13 when the rod 27 and piston 18 move upwardly for a given distance. To lock the rod 27 and piston 19 in an uppermost position, the upper end of the rod 27 in bore 28 has an annular detent groove 31 which is adapted, when projection 30 abuts member 13, to receive a detent 32, the detent 32 being spring mounted in coupling member 13 so as to latch with groove 31.

To provide a sample-receiving chamber portion 37a which will initially have zero volume, the lower face 33 of the upper piston 19 is positioned adjacent to and in abutment with the upper face 26 of piston 18, the faces 26, 33 being substantially parallel to one another. Piston 19 has a central bore 35 which receives piston rod 27, the piston 19 being relatively movable between the piston 18 and abutment 30 on piston rod 27. Pistons 18 and 19 are provided with sealing means 34a, 34b such as O-rings disposed above and below openings 25. Since the seal 34a of piston 19 is above openings 25 in tubular member 12, the hydrostatic pressure of fluid in the well is applied to one side of piston 19. The upper side 36 of piston 19 together with cylinder 17 and coupling member 13 form another chamber portion 37 which is filled with a relatively incompressible fluid, such as water or oil. The fluid can be at atmospheric pressure so that well pressure transmitted through the pistons maintains the same pressure on the fluid in chamber 37 as in well bore. The fluid also can be placed under an initial pressure to minimize effects of compressibility, if desired or necessary. Of course, piston 19 and rod 27 as well as cylinder 17 are suitably fluid sealed, for example, by O rings 34, 34d; and, without further description, it will be readily apparent to those skilled in the art that fluid seals, such as O rings 34, 34d are employed throughout the apparatus where necessary or desirable.

Chamber 37 is connected via a passageway 39 in coupling member 13 to a flow regulating means 40 and a break valve 41 which are disposed in a cylindrical housing 42. Housing 42 abuts member 13 and is suitably secured within the lower portion of upper tubular member 11 in a convenient well-known manner. Flow regulating means 40 is illustrated as a flow restricting cylinder 44 having a small choke orifice 45 permitting fluid communication between the passageway 39 and break valve 41, the break valve 41 being connected to flow means 40 by a passageway 47. Break valve 41 consists of a hollow plug member disposed in a bore 49 so as to plug the bore. The plugged bore 49 is connected by another passageway 55 in the housing 42 to a chamber 57 formed in the upper portion of the tubular member 11, the chamber 57 being at a relatively low pressure, for example, atmospheric air pressure.

To open the plug bore 49 and permit fluid from chamber 37 to pass into low pressure chamber 57, a hammer pin 50 is slidably disposed in a bore 51 which is transverse to the plug bore 49. Hammer pin 50 is hollow and open at an end opposite to bore 49 so as to receive an explosive device 52. Explosive device 52 when ignited is adapted to impel hammer pin 50 into bore 49 and break off an end portion 53 of the plug member 41, the portion 53 being disposed in the path of movement of the hammer pin 50. End portion 53 when broken off from plug member 41 opens a passage through the hollow portion of the plug. Explosive device 52 may be any well-known explosive charge which is adapted to be exploded by a conventional igniter (not shown), the igniter being connected by a conductor 58 to a source of power at the surface (not shown).

In operation, the device is assembled with upper and lower surfaces 26, 33 of pistons 18, 19, respectively, in abutment and the chamber 37 filled with fluid under pressure and blocked by plug 41, the fluid being admitted through an access port 60 in coupling member 13. The apparatus is then lowered into a well, through tubing or casing, if present, to the level at which a sample is desired, the positioning of the apparatus being accomplished by well-known means and techniques.

At the desired level, the pressure across piston 18 is pressure balanced by the openings 23, 25 and 29 while the hydrostatic pressure on the piston 19 is balanced by the fluid in chamber 37. The explosive device 52 is then operated so that hammer pin 50 is impelled into bore 49 breaking the projection 53 of the break valve 41 and thereby opening a passage between chamber 37 and low pressure chamber 57 (see FIG. 2). At this point the hydrostatic pressure applied to one side of piston 19 forces the fluid in chamber 37 through the flow regulating device 40 into the chamber 57 which is at atmospheric pressure. The flow means 40 determines the rate of fluid flow (i.e., by the size of the orifice 45, the viscosity of fluid in chamber 37 and the hydrostatic well pressure) so that turbulence in the sample-receiving chamber is avoided and the piston 19 will therefore have a relatively slow upward motion. The precise rate of movement of the piston will be determined in accordance with the pressures expected and regulated by the flow means 40.

The sample-receiving chamber 37a between the piston surfaces 26, 33 and cylinder 17 continues to expand until the upper piston 19 abuts the projection 30 on the piston rod 27, the spacing of the pistons thereby limiting the expansion and volume of the sample-receiving chamber to a predetermined value. Chamber 57 is sized so that when a full sample has been obtained in the sample-receiving chamber, the pressure in chambers 37 and 57 remains less than the hydrostatic pressure of the well fluid. Hence, the well fluid in the sample chamber continues to exert pressure on the piston 19 and both pistons will continue their upward movement until the projection 30 on piston rod 27 abuts member 13. Rod 27 locks in this upward position by virtue of detent 32 and detent groove 31. Of course, while the pistons are moving, the seal 34b in the lower piston 18 passes openings 25 thereby isolating the collected sample between the pistons from the openings 25 so that the hydrostatic pressure on piston 18 continues movement of the pistons.

Thereafter, as the tool is raised from the well, the pistons 18, 19 remain in the locked position due to the locking of the piston rod 27 in its upper position. At the surface of the earth, the entire sample can be recovered from the sample chamber in the following manner. End cap 14 is removed and the conventional devices to which the sample is to be transferred are connected to a valve 63 in piston 18. Valve 63 is opened while a pressure device (not shown) connected to port 60 is pressured up to move piston 19 towards piston 18 until the pistons are again in an adjacent position thus permitting transfer under pressure of the entire sample recovered.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

What is claimed is:

1. A borehole apparatus for obtaining a representative fluid sample in a bore hole comprising: a housing adapted for passage through a borehole, said housing having a cylindrical bore; first and second pistons slidably and sealingly positioned in said bore and relatively movable between a collapsed position of adjacency and an extended, spaced-apart position to define therebetween a fluid sample-receiving chamber, said housing having a sample-admitting opening positioned to open between said pistons in their collapsed position to admit a fluid sample therebetween; means in said housing for controlling the rate of relative movement between said pistons upon admission of a fluid sample therebetween; and means for coupling said pistons to one another at said extended position of said pistons for joint movement relative to said sample-admitting opening to displace said pistons and sample therebetween from access to said sample-admitting opening.

2. A borehole apparatus for obtaining a representative fluid sample in a borehole comprising: a housing adapted for passage through a borehole, said housing having a cylindrical bore; first and second pistons slidably and sealingly positioned in said bore and relatively movable between a collapsed position of adjacency and an extended, spaced-apart position to define therebetween a fluid sample-receiving chamber, said housing having openings disposed above and below one of said pistons, one of said openings positioned to open between said pistons in their collapsed position to admit a fluid sample therebetween; means in said housing for controlling the rate of relative movement between said pistons upon admission of a fluid sample therebetween; and means for coupling said pistons to one another at said extended position of said pistons for joint movement relative to said sample-admitting opening to displace said pistons and sample therebetween from access to said sample-admitting opening.

3. A borehole apparatus for obtaining a representative fluid sample in a borehole comprising: a housing adapted for passage through a borehole, said housing having a cylindrical bore; first and second pistons slidably and sealingly positioned in said bore and relatively movable between a collapsed position of adjacency and an extended, spaced-apart position to define therebetween a fluid sample-receiving chamber, said housing having a sample-admitting opening positioned to open between said pistons in their collapsed position to admit a fluid sample therebetween, and one of said pistons having a bore; a piston rod secured to said other piston and slidably and sealingly received by said bore in said one piston; means in said housing for controlling the rate of relative movement between said pistons upon admission of a fluid sample therebetween; and a projection on said piston rod adapted to limit movement of said one piston in said extended position, said pistons being coupled at said extended position by said one piston engaging said projection for joint movement relative to said sample-admitting opening to displace said pistons and sample therebetween from access to said sample-admitting opening.

4. A borehole apparatus for obtaining a representative fluid sample in a borehole comprising: a housing adapted for passage through a borehole, said housing having a cylindrical bore; first and second pistons slidably and sealingly positioned in said bore and relatively movable between a collapsed position of adjacency and an extended, spaced-apart position to define therebetween a fluid sample-receiving chamber, said housing having a sample-admitting opening postioned to open between said pistons in their collapsed position to admit a fluid sample therebetween; means in said housing for controlling the rate of relative movement between said pistons upon admission of a fluid sample therebetween; means for coupling said pistons to one another at said extended position of said pistons for joint movement relative to said sample-admitting opening to displace said pistons and sample therebetween from access to said sample-admitting opening; and means to releasably lock said coupled pistons and sample therebetween in said housing after displacing said pistons and sample therebetween from access to said sample-admitting opening.

5. A borehole apparatus for obtaining a representative fluid sample in a borehole comprising: a housing adapted for passage through a borehole, said housing having a cylindrical bore; first and second pistons slidably and sealingly positioned in said bore and relatively movable between a collapsed position of adjacency and an extended, spaced-apart position to define therebetween a fluid sample-receiving chamber, said housing having openings disposed above and below one of said pistons, one of said openings positioned to open between said pistons in their collapsed position to admit a fluid sample therebetween, and one of said pistons having a bore; a piston rod secured to said other piston and slidably and sealingly received by said bore in said one piston; means in said housing for controlling the rate of relative movement between said pistons upon admission of a fluid sample therebetween; a projection on said piston rod adapted to limit movement of said one piston in said extended position, said pistons being coupled at said extended position by said one piston engaging said projection for joint movement relative to said sample-admitting opening to displace said pistons and sample therebetween from access to said sample-admitting opening; and means to releasably lock said coupled pistons and sample therebetween in said housing after displacing said pistons and sample therebetween from access to said sample-admitting opening.

6. A borehole apparatus for obtaining a representative fluid sample in a borehole comprising: a housing adapted for passage through a borehole, said housing having an expansible sample-receiving chamber including first and second pistons relatively movable between a collapsed position of adjacency and substantially zero volume and an extended, spaced-apart position to contain a predetermined volume of fluid sample; means to limit expansion of said chamber when said pistons are at said extended position yet permit said pistons to simultaneously move relative to said housing, said housing having a sample-admitting opening communicating between said chamber and the fluid to be sampled in the borehole, said opening positioned to open between said pistons in said collapsed position so that hydrostatic well pressure tends to urge said pistons to separate from one another from said collapsed position to said extended position; and means in said housing to hold said pistons in said collapsed position until it is desired to obtain a fluid sample and operable to release said pistons from said collapsed position whereby a fluid sample of a predetermined volume may be obtained by movement of said pistons to said extended position, said pistons in said extended position and entrapped fluid sample therebetween being simultaneously movable in said housing to isolate said sample-receiving chamber from said sample-admitting opening.

7. A borehole apparatus for obtaining a representative fluid sample in a borehole comprising: a housing adapted for passage through a borehole, said housing having a tubular section with a shouldered portion at one end thereof; first and second pistons slidably and sealingly received initially at said one end of said tubular section, said pistons being positioned in a collapsed position at said one end of said section with facing surfaces in proximate contact to form an expansible sample-receiving chamber initially at substantially zero volume, said pistons being relatively movable in said tubular section to an extended spaced-apart position thereby to expand the volume of said sample-receiving chamber to contain a predetermined volume of fluid sample, said housing having openings above and below one of said pistons, said openings communicating between said tubular section and the fluid to be sampled in the borehole, one of said openings positioned to open between said pistons in said collapsed position to permit the introduction of hydrostatic well pressure therebetween which tends to urge the other of said pistons from said collapsed position to said extended position, and said other piston having a bore; a piston rod secured to said one piston and slidably and sealingly received by said bore, said rod having a projection thereon to limit movement of said other piston and thereby limit expansion of said sample-receiving chamber when said pistons are at said extended position; and means in said housing to hold said pistons in said collapsed position until it is desired to obtain a fluid sample and operable to release said pistons from said collapsed position whereby a fluid sample of a predetermined volume may be obtained by movement of said other piston to said extended position, said pistons in said extended position and entrapped fluid sample therebetween being simultaneously movable in said tubular section to isolate said sample-receiving chamber from said sample-admitting opening.

8. A borehole apparatus for obtaining a representative fluid sample in a borehole comprising: a housing adapted for passage through a borehole, said housing having a tubular section with a shouldered portion at one end thereof; first and second pistons slidably and sealingly received initially at one end of said tubular section, said pistons being positioned in a collapsed position at said one end of said section with facing surfaces in proximate contact to form a first expansible sample-receiving chamber initially at substantially zero volume, one of said pistons having a remaining surface forming with said tubular section a second chamber, said pistons being relatively movable in said tubular section to an extended, spaced-apart position thereby to expand the volume of said sample-receiving chamber to contain a predetermined volume of fluid sample, said housing having a sample-admitting opening communicating between said sample-receiving chamber and the fluid to be sampled in the bore hole, said opening being disposed adjacent to said pistons in said collapsed position to permit the introduction of hydrostatic well pressure therebetween which tends to urge said one piston from said collapsed position to said extended position; and means in said housing to hold said pistons in said collapsed position until it is desired to obtain a fluid sample, said holding means including a relatively incompressible fluid in said second chamber to maintain said pistons in a position of adjacency, a third low pressure chamber in said housing, and means connecting said second chamber with said third chamber including a normally-closed valve means, said valve means, when open, releasing said fluid in said second chamber to said third chamber thereby releasing said pistons from said collapsed position whereby a fluid sample of a predetermined volume may be obtained by movement of said one piston to said extended position, said pistons in said extended position and entrapped fluid sample therebetween being simultaneously movable in said tubular section to isolate said sample-receiving chamber from said sample-admitting opening; means in said housing for opening said valve means.

9. A borehole apparatus for obtaining a representative fluid sample in a borehole comprising: a housing adapted for passage through a borehole, said housing having a tubular section with a shouldered portion at one end thereof; first and second pistons slidably and sealingly received initially at one end of said tubular section, said pistons being positioned in a collapsed position at said one end of said section with facing surfaces in proximate contact to form a first expansible sample-receiving chamber initially at substantially zero volume, one of said pistons having a remaining surface forming with said tubular section a second chamber, said pistons being relatively movable in said tubular section to an extended, spaced-apart position thereby to expand the volume of said sample-receiving chamber to contain a predetermined volume of fluid sample, said housing having openings above and below the other of said pistons, said openings communicating between said tubular section and the fluid to be sampled in the borehole, one of said openings positioned to open between said pistons in said collapsed position to permit the introduction of hydrostatic well pressure therebetween which tends to urge said one piston from said collapsed position to said extended position, and said one piston having a bore; a piston rod secured to said other piston and slidably and sealingly received by said bore, said rod having a projection thereon to limit movement of said one piston and thereby limit expansion of said sample-receiving chamber when said pistons are at said extended position; means in said housing to hold said pistons in said collapsed position until it is desired to obtain a fluid sample, said holding means including a relatively incompressible fluid in said second chamber to maintain said pistons in a position of adjacency, a third low pressure chamber in said housing, and means connecting said second chamber with said third chamber including a normally-closed valve means, said valve means, when open, releasing said fluid in said second chamber to said third chamber thereby releasing said pistons from said collapsed position whereby a fluid sample of a predetermined volume may be obtained by movement of said one piston to said extended position, said pistons in said extended position and entrapped fluid sample therebetween being simultaneously movable in said tubular section to isolate said sample-receiving chamber from said sample-admitting opening; means in said housing for opening said valve means and means to releasably lock said pistons in said housing after isolating said sample-receiving chamber from said sample-admitting opening.

10. A borehole apparatus for obtaining a representative fluid sample in a borehole comprising: a housing adapted for passage through a borehole, said housing having first and second chambers; a member separating said first chamber into said first and second chamber portions and adapted to move between a position in said housing where said first chamber portion is at zero volume and a position wherein said first chamber portion is at a predetermined volume, said housing having normally open ports to permit well fluid access to said first chamber portion; a relatively incompressible fluid in said second chamber portion; a passageway interconnecting said second chamber portion and said second chamber; and means in said passageway for releasably blocking said passageway, said fluid in said second chamber portion serving to maintain said first chamber portion at zero volume until said passageway is unblocked whereupon said fluid may be displaced from said second chamber portion to said second chamber through said passageway as said first chamber portion expands due to receipt of a fluid sample.

11. A borehole apparatus for obtaining a prepresentative fluid sample in a borehole comprising: a housing adapted for passage through a borehole, said housing having first and second chambers; a member separating said first chamber into first and second chamber portions and adapted to move between a position in said housing where said first chamber portion is at zero volume and a position wherein said first chamber portion is at a predetermined volume, said housing having normally open ports to permit well fluid access to said first chamber portion; a relatively incompressible fluid in said second chamber portion; a passageway interconnecting said second chamber portion and said second chamber; means in said passageway for regulating the flow of fluid through said passageway; and means in said passageway for releasably blocking said passageway, said fluid in said second chamber portion serving to maintain said first chamber portion at zero volume until said passageway is unblocked whereupon said fluid may be displaced from said second chamber portion to said second chamber through said passageway as said first chamber portion expands due to receipt of a fluid sample.

12. A borehole apparatus for obtaining a representative fluid sample in a borehole comprising: a housing adapted for passage through a borehole, said housing having first and second chambers; a pair of pistons slidably received in said housing, said first chamber portion being defined between said pistons, said pistons being relatively movable between a collapsed position of adjacency where said first chamber portion is at zero volume and a position where said first chamber portion is at a predetermined volume, said housing having normally open ports to permit well fluid access to said first chamber portion, and one of said pistons separating said first chamber portion from said second chamber portion; relatively incompressible fluid in said second chamber portion; a passageway interconnecting said second chamber portion and said second chamber; and means in said passageway for releasably blocking said passageway, said fluid in said second chamber portion serving to maintain said first chamber portion at zero volume until said passageway is unblocked whereupon said fluid may be displaced from said second chamber portion to said second chamber through said passageway as said first chamber portion expands due to receipt of a fluid sample.

References Cited in the file of this patent
UNITED STATES PATENTS

| | | |
|---|---|---|
| Re. 24,352 | Comstock | Aug. 27, 1957 |
| 2,201,447 | Mullins | May 21, 1940 |
| 2,308,387 | Potts | Jan. 12, 1943 |
| 2,637,400 | Brown et al. | May 5, 1953 |
| 2,674,313 | Chambers | Apr. 6, 1954 |